United States Patent [19]

Kobayashi et al.

[11] Patent Number: 5,166,273

[45] Date of Patent: Nov. 24, 1992

[54] METHOD OF PRODUCING MODIFIED POLYOLEFIN

[75] Inventors: Akira Kobayashi; Tatsuo Teraya; Yuji Fujita; Shigeyuki Toki; Eiji Kuchiki, all of Saitama, Japan

[73] Assignee: Tonen Corporation, Tokyo, Japan

[21] Appl. No.: 681,599

[22] Filed: Apr. 8, 1991

[30] Foreign Application Priority Data

| Apr. 6, 1990 | [JP] | Japan | 2-91474 |
| Apr. 11, 1990 | [JP] | Japan | 2-95684 |
| May 18, 1990 | [JP] | Japan | 2-128923 |
| Oct. 29, 1990 | [JP] | Japan | 2-291087 |
| Dec. 27, 1990 | [JP] | Japan | 2-414659 |

[51] Int. Cl.$^5$ ............ C08F 255/02; C08F 255/04; C08F 255/06; C08F 255/08
[52] U.S. Cl. .................... 525/286; 525/263; 526/266; 526/304
[58] Field of Search .................. 525/263, 286

[56] References Cited

U.S. PATENT DOCUMENTS 4,032,594 6/1977 Serratore et al. .
4,548,993 10/1985 Garagnani et al. ............ 525/286

FOREIGN PATENT DOCUMENTS

| 0146130 | 6/1985 | European Pat. Off. . |
| 0317358 | 5/1989 | European Pat. Off. . |
| 1326931 | 6/1962 | France . |
| 50-4189 | 1/1975 | Japan . |
| 50-52156 | 5/1975 | Japan . |
| 51-122152 | 10/1976 | Japan . |
| 52-25845 | 2/1977 | Japan . |
| 52-105993 | 9/1977 | Japan . |
| 55-50040 | 4/1980 | Japan . |
| 57-165413 | 10/1982 | Japan . |
| 58-67743 | 4/1983 | Japan . |
| 60-130580 | 7/1985 | Japan . |
| 1-236214 | 9/1989 | Japan . |

*Primary Examiner*—Jacob Ziegler
*Attorney, Agent, or Firm*—Armstrong, Nikaido, Marmelstein, Kubovcik & Murray

[57] ABSTRACT

The modified polyolefin is produced by graft-polymerizing (a) 100 parts by weight of a polyolefin, with (b) 0.01-30 parts by weight of a glycidyl compound represented by the following general formula:

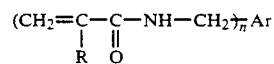

wherein R is a hydrogen atom or an alkyl group having 1-6 carbon atoms, Ar is an aromatic hydrocarbon group having 6-20 carbon atoms and containing at least one glycidyloxy group, and n is an integer of 1-4. The glycidyl compound may be added stepwise to have a higher graft ratio. The modified polyolefin may be graft-copolymerized with polyesters at a high graft ratio.

10 Claims, No Drawings

METHOD OF PRODUCING MODIFIED POLYOLEFIN

BACKGROUND OF THE INVENTION

The present invention relates to a method of producing a modified polyolefin serving as a compatibilizer for various resin compositions, and particularly to a method of producing a modified polyolefin suffering from only small decrease in a molecular weight in the course of graft polymerization and having a high graft ratio.

Since the polyolefin resins such as polypropylene, polyethylene and olefinic elastomers are low in costs and have excellent moldability, insulation, chemical resistance, mechanical strength, etc., they can be used in various applications such as films, fibers, molded articles, etc.

However, since the polyolefin resins consisting of non-polar molecules have poor compatibility with such other resins as nylons, polyesters, polycarbonates having strong polarities, the blends of these polyolefins with such other resins fail to provide molded products with sufficiently good appearance and mechanical properties.

Also, the polyolefin resins are poor in chemical properties such as adhesion, paintability, printability, hydrophilic nature, etc. due to their chemical structures. Accordingly, an extensive research has been conducted to improve such properties by graft-polymerizing the polyolefin resins with various unsaturated compound monomers.

Japanese Patent Laid-Open No. 50-52156 discloses a method of producing a modified polyolefin composition comprising melt-blending a propylene-based polyolefin, a polar vinyl monomer, a radical generator and a microporous filler at a temperature higher than a decomposition temperature of the radical generator.

Japanese Patent Laid-Open No. 52-105993 discloses a method of producing a modified polypropylene comprising reacting polypropylene, a liquid rubber and maleic anhydride in a solvent by using a radical generator.

Japanese Patent Laid-Open No. 55-50040 discloses a method of producing a modified polypropylene having a maleic acid graft content of 1–15 weight %, comprising reacting polypropylene, rubber and maleic anhydride in the absence of a solvent by using a radical generator.

Japanese Patent Laid-Open No. 58-67743 discloses a modified polypropylene composition comprising a modified polypropylene, a part or whole of which is grafted with unsaturated carboxylic acid, a cross-linking agent and an organic peroxide having a one-minute half-life temperature 10° C. or more higher than the melting point of the modified polypropylene.

Further, Japanese Patent Laid-Open No. 1-236214 discloses a method of producing a modified polyolefin resin composition comprising the step of blending in a molten state a mixture of (A) 100 parts by weight of a polyolefin resin having a melt flow rate of 0.05–60 g/10 minutes, (B) 0.1–5 parts by weight of at least one compound selected from an unsaturated carboxylic acid, its derivative and an epoxy monomer, (C) 0.1–5 parts by weight of an unsaturated aromatic monomer, and (D) 0.01–2 parts by weight of a radical generator, a molar ratio of (B)/(C) being 0.1 and more and less than 1.

Also, various graft polymerization methods of polyethylene with unsaturated carboxylic acids are disclosed, for instance, in Japanese Patent Laid-Open Nos. 50-4189, 51-122152, 52-25845 and 57-165413.

However, in these methods of producing modified polyolefins, since a decomposition reaction also takes place in the main chain of the polyolefins in the course of the graft reaction, only modified polyolefins having low molecular weights can be obtained. Besides, the graft monomers such as maleic anhydride, etc. have a sublimation property and generate an unpleasant odor, making it difficult to handle them at melt reaction. In addition, the resulting modified polyolefins suffer from discoloration such as yellowish coloring. Further, since the modified polyolefins obtained by the above methods fail to have a sufficiently high graft ratio of maleic anhydride, etc., they are unsatisfactory as compatibilizers.

In order to overcome these problems, attempts have been made to use as a modifying monomer glycidyl methacrylate, etc. containing an epoxy group in place of the maleic anhydride. However, since the glycidyl methacrylate is in the form of a liquid, its handling is difficult at a melt reaction. It also generates an unpleasant odor and suffers from discoloration and poor reaction efficiency.

OBJECT AND SUMMARY OF THE INVENTION

Accordingly, an object of the present invention is to provide a method of efficiently producing a modified polyolefin serving as a good compatibilizer for various resin compositions, suffering from only a small decrease in a molecular weight in the course of graft polymerization and having a high graft ratio.

As a result of intense research in view of the above object, the inventors have found that by grafting a polyolefin with a particular glycidyl compound containing an acrylamide group and an epoxy group, in the presence of a radial generator, the above object can be achieved. The present invention has been completed based on this finding.

Thus, the method of producing a modified polyolefin according to the present invention comprises the step of graft-polymerizing:

(a) 100 parts by weight of a polyolefin, with (b) 0.01–30 parts by weight of a glycidyl compound represented by the following general formula:

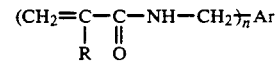

$$(CH_2=C-C-NH-CH_2)_n Ar$$
$$\quad\ |\ \ \|$$
$$\quad\ R\ \ O$$

wherein R is a hydrogen atom or an alkyl group having 1–6 carbon atoms, Ar is an aromatic hydrocarbon group having 6–20 carbon atoms and containing at least one glycidyloxy group, and n is an integer of 1–4.

In the preferred embodiment, the glycidyl compound is added to the polyolefin stepwise until the total amount of the glycidyl compound reaches a desired level.

DETAILED DESCRIPTION OF THE INVENTION

A. Polyolefin

The polyolefin usable in the present invention is generally defined as a polymer or copolymer of one or more α-olefins. Typical examples of the polyolefins are polypropylene, propylene random copolymers, polyethylene and olefinic elastomers.

(a) Polypropylene

The polypropylene is not restricted to homopolymers of propylene, and block or random copolymers of propylene and ethylene are also included. In the case of copolymers with ethylene, the ethylene content is 10 weight % or less, preferably 1-10 weight %. Such a polypropylene resin usually has a melt flow rate of 0.01-100 g/10 minutes, preferably 0.5-80 g/10 minutes (MFR, JIS K 7210, 2.16 kg load, 230° C.).

(b) Propylene Random Copolymer

The propylene random copolymer contains an unconjugated diene comonomer represented by the following general formula:

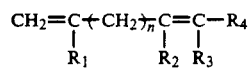

wherein each of $R_1$-$R_4$ is a hydrogen atom or an alkyl group having 1-6 carbon atoms, and n is an integer of 1-20.

The unconjugated dienes contained in the above propylene random copolymer (PPDM) include 2-methyl-1,4-pentadiene, 1,4-hexadiene, 4-methylidene-1-hexene, 4-methyl-1,4-hexadiene, 5-methyl-1,4-hexadiene, 1,4-heptadiene, 4-ethyl-1,4-hexadiene, 4,5-dimethyl-1,4-hexadiene, 4-methyl-1,4-heptadiene, 4-ethyl-1,4-heptadiene, 5-methyl-1,4-heptadiene, 5-methyl-1,4-octadiene, 1,5-heptadiene, 1,5-octadiene, 5-methyl-1,5-heptadiene, 6-methyl-1,5-heptadiene, 2-methyl-1,5-hexadiene, 1,6-octadiene, 6-methyl-1,6-octadiene, 7-methyl-1,6-octadiene, 2-methyl-1,6-heptadiene, 1,9-decadiene, 1,13-tetradecadiene, etc. Among them, 1,4-hexadiene, 2-methyl-1,5-hexadiene, 7-methyl-1,6-octadiene, 1,9-decadiene, 1,13-tetradecadiene, etc. are particularly preferable. These unconjugated dienes may be used in combination.

In the random copolymerization of propylene with the unconjugated diene, a usual polymerization method using a Ziegler-Natta catalyst can be employed. In this case, the percentage of the unconjugated diene may be 0.05-10 mol %, based on the total of propylene and the unconjugated diene. When it is less than 0.05 mol %, a high graft ratio cannot be achieved in the production of the propylene random copolymer. On the other hand, when it exceeds 10 mol %, the resulting modified propylene random copolymer shows a drastically decreased crystallization degree. The preferred amount of the unconjugated diene in the propylene random copolymer is 0.1-3 mol %.

The propylene random copolymer may further contain up to 5 mol % of other unsaturated monomers such as ethylene, butene-1, etc. The weight-average molecular weight of the propylene random copolymer is usually 100,000-1,000,000.

(c) Polyethylene

The polyethylene usable for the method of the present invention has a melt index of 0.01-100 g/10 minutes (MI, 190° C., 2.16 kg load) and a density of 0.90-0.98 g/cm$^3$ (according to ASTM D1505), which may be copolymerized with 20 weight % or less of other α-olefins. Such polyethylenes include low-density polyethylene, linear low-density polyethylene, high-density polyethylene and very-low-density polyethylene, etc.

(d) Olefinic Elastomer

The olefinic elastomers are copolymer rubbers comprising ethylene and one or more α-olefins other than ethylene selected from propylene, 1-butene, 1-hexene, 4-methyl-1-pentene, etc. Typical examples of the copolymer rubbers comprising ethylene and one or more α-olefins other than ethylene include an ethylene-propylene copolymer rubber (EPR), an ethylene-butene copolymer rubber (EBR), an ethylene-propylene-diene copolymer rubber (EPDM), etc. The dienes in the ethylene-propylene-diene copolymer rubber (EPDM) include unconjugated dienes such as dicyclopentadiene, 1,4-hexadiene, cyclooctadiene, methylene norbornene, etc. and conjugated dienes such as butadiene, isoprene, etc.

The olefinic elastomer has an ethylene content of 5-95 weight %, preferably 10-90 weight %. When the ethylene content is less than 5 weight % or more than 95 %, the resulting composition does not show sufficient elastomeric properties. The crystallization degree of the preferred olefinic elastomer is usually 40 weight % or less.

The ethylene-propylene copolymer rubber (EPR) used in the present invention preferably comprises 50-80 mol % of a repeating unit derived from ethylene, and 20-50 mol % of a repeating unit derived from propylene. The more preferred range is 60-70 mol % for the ethylene repeating unit and 30-40 mol % for the propylene repeating unit.

The EPR has a melt flow rate of 0.01-50 g/10 minutes (MFR, 230° C., 2.16 kg load), preferably 0.5-30 g/10 minutes.

The ethylene-butene copolymer rubber (EBR) used in the present invention preferably comprises 50-90 mol % of a repeating unit derived from ethylene, and 10-50 mol % of a repeating unit derived from butene. The more preferred range is 60-80 mol % for the ethylene repeating unit and 20-40 mol % for the butene repeating unit.

The EBR has a melt flow rate of 0.01-50 g/10 minutes (MFR, 230° C., 2.16 kg load), preferably 0.5-30 g/10 minutes.

The ethylene-propylene-diene copolymer rubber (EPDM) used in the present invention preferably comprises 40-70 mol % of a repeating unit derived from ethylene, 30-60 mol % of a repeating unit derived from propylene, and 1-10 mol % of a repeating unit derived from a diene. The more preferred range is 50-60 mol % for the ethylene repeating unit, 40-50 mol % for the propylene repeating unit, and 3-6 mol % for the diene repeating unit.

The EPDM has a melt flow rate of 0.01-50 g/10 minutes (MFR, 230° C., 2.16 kg load), preferably 0.1-30 g/10 minutes.

The ethylene-propylene copolymer rubber (EPR), the ethylene-butene copolymer rubber (EBR) and the ethylene-propylene-diene copolymer (EPDM) are basically composed of the above repeating units, but they may further contain additional repeating units derived from other α-olefins such as 4-methyl-1-pentene, etc. in an amount of 10 mol % or less.

The olefinic elastomers may also contain other α-olefins such as vinyl acetate, acrylate, etc. and one typical example of such olefinic elastomers is an ethylene-vinyl acetate copolymer (EVA).

In the present invention, olefinic elastomer compositions comprising an olefinic elastomer and polypropylene and/or polyethylene may also be used. In this case, the polypropylene and the polyethylene may be the same as described above.

In the case of using the olefinic elastomer composition containing the polypropylene and/or the polyethylene, the amount of the polypropylene and/or the polyethylene, based on 100 weight % of the olefinic elastomer, is 80 weight % or less, preferably 50 weight % or less. When the amount of the polypropylene and/or the polyethylene exceeds 80 weight %, the resulting composition fails to show excellent elastomeric properties.

B. Modifying Monomer

The modifying monomer (graft monomer) usable in the present invention is a glycidyl compound represented by the following general formula (1):

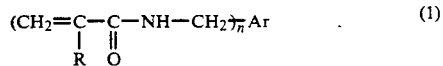

wherein R is a hydrogen atom or an alkyl group having 1-6 carbon atoms, Ar is an aromatic hydrocarbon group having 6-20 carbon atoms and containing at least one glycidyloxy group, and n is an integer of 1-4.

One of the preferred glycidyl compounds may be represented by the following formula (2):

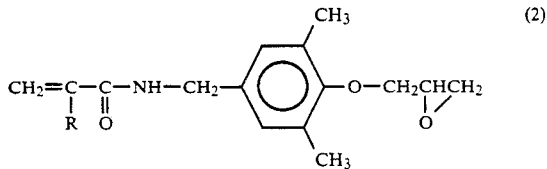

wherein R is a hydrogen atom or an alkyl group having 1-6 carbon atoms.

Such a glycidyl compound may be produced by a method disclosed, for instance, in Japanese Patent Laid-Open No. 60-130580, which constitutes a part of the disclosure.

In this method, a condensation reaction takes place between an aromatic hydrocarbon containing at least one phenolic hydoxyl group, and either one of N-methylol acrylamide, N-methylol methacrylamide and alkyl ether derivatives of N-methylol methacrylamide (these acrylamides may be summarily called "N-methylol acrylamides") in the presence of an acidic catalyst, so that a compound represented by the following general formula (3) is produced:

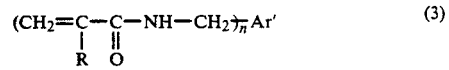

wherein R is a hydrogen atom or an alkyl group having 1-6 carbon atoms, Ar' is an aromatic hydrocarbon group having 6-20 carbon atoms and containing at least one hydroxyl group, and n is an integer of 1-4.

The above aromatic hydrocarbons having at least one phenolic hydroxyl group are not particularly restricted, and their examples include phenolic compounds such as phenol, o-cresol, m-cresol, p-cresol, 2,6-xylenol, 2,4-xylenol, o-chlorophenol, m-chlorophenol, p-chlorophenol, o-phenylphenol, 2,6-diphenylphenol, etc.; polyphenolic compounds such as hydroquinone, catechol, phloroglucinol, etc.; polycyclic hydroxy compounds such as 1-naphthol, 2-naphthol, 9-hydroxy anthracene, etc.; bis phenols such as 2,2-bis (4-hydroxyphenyl) propane (bisphenol-A), bis (4-hydroxyphenyl) methane, etc.

By substituting the hydroxyl group of the compound represented by the general formula (3) with a glycidyl group, the glycidyl compound represented by the general formula (1) may be obtained.

This substitution reaction with the glycidyl group takes place by two steps: First, an addition reaction of the compound represented by the general formula (3) with an epihalohydrin is carried out, and a hydrogen halide-removing reaction is subsequently carried out by using a caustic alkali.

The addition reaction of the compound (3) with an epihalohydrin is usually carried out by using a phase-transfer catalyst.

The epihalohydrins used herein include epichlorohydrin, epibromohydrin, epiiodohydrin, etc.

The phase-transfer catalysts which may be used in the present invention include, for instance, quaternary ammonium salts such as tetrabutyl ammonium bromide, trioctyl methyl ammonium chloride, benzyl triethyl ammonium chloride, etc.; quaternary phosphonium salts such as tetraphenyl phosphonium chloride, triphenyl methyl phosphonium chloride, etc.; quaternary arsonium salts, etc.

The amount of the phase-transfer catalyst is preferably 0.01-100 mol %, based on 100 mol % of the compound represented by the general formula (3). The particularly preferred amount of the phase-transfer catalyst is 0.05-10 mol %. The reaction conditions (time and temperature) of the above addition reaction are 50°-120° C. for 5 minutes to 2 hours, more preferably 80°-110° C. for 10-30 minutes.

The reaction is followed by a hydrogen halide-removing reaction by using a caustic alkali.

The caustic alkali include sodium hydroxide, potassium hydroxide, lithium hydroxide, etc. They may be used in the form of a solid or an aqueous solution. The catalysts used for removing a hydrogen halide may be the same as those of the phase-transfer catalysts, and other catalysts than the above phase-transfer catalysts include crown ethers, ethylene glycol, diethylene glycol, triethylene glycol, tetraethylene glycol, polyethylene glycol, etc.

The caustic alkali used in the above reaction is preferably in an amount equal to or larger than (by mol) that of the compound represented by the general formula (3), more preferably 1.1-1.5 times by mol that of the compound represented by the general formula (3). The reaction conditions (time and temperature) of the hydrogen halide-removing reaction are 20°-90° C. for 10 minutes to 3 hours, preferably 40°-70° C. for 30 minutes to 2 hours.

C. Graft Polymerization

The graft polymerization of the polyolefin with the above glycidyl compound may be carried out by a melt-blending method or a solution method. In the case of the melt-blending method, a polyolefin, a glycidyl compound (graft monomer), and if necessary, a catalyst are introduced into an extruder, a double-screw blender, etc., and the resulting mixture is subjected to melt blending at a temperature of 120°-300° C. for 0.1-20 minutes. Incidentally, although the melt-blending temperature may vary depending upon the types of polyolefins, it is about 120°-300° C. in the case of the polyethylene, about 180°-300° C. in the case of the polypropylene, and about 150°-300° C. in the case of the olefinic elastomer (or the olefinic elastomer composition).

In the case of the solution method, the above starting materials are dissolved in an organic solvent such as xylene, etc., and the solution is stirred while heating at a temperature of 90°-200° C. for 0.1-100 hours.

In both cases, usual radical polymerization catalysts may be used for the graft polymerization, and peroxides such as benzoyl peroxide, lauroyl peroxide, di-tert-butyl peroxide, acetyl peroxide, tert-butyl perbenzoate, dicumyl peroxide, perbenzoic acid, peracetic acid, tert-butyl perpivalate, 2,5-dimethyl-2,5-di(tert-butyl peroxy) hexyne, etc., diazo compounds such as azobisisobutyronitrile, etc. are preferable. The amount of the graft polymerization catalyst is 0.1-10 parts by weight per 100 parts by weight of the glycidyl compound graft monomer. Incidentally, in the present invention, a phenolic antioxidant may be added at the time of graft reaction, but the addition thereof is not preferred when the graft polymerization catalyst is not added.

The amount of the glycidyl compound is 0.01-30 parts by weight, preferably 0.1-10 parts by weight, per 100 parts by weight of the polyolefin. When the amount of the glycidyl compound is less than 0.01 parts by weight, a high graft ratio is hardly achieved in the resulting modified polyolefin, and when it exceeds 30 parts by weight, the resulting modified polyolefin suffers from a remarkable decrease in a molecular weight.

In the preferred embodiment, a polyolefin, a glycidyl compound graft monomer, and if necessary, a catalyst are melt-blended, and the amount of the glycidyl compound added at the first step is 0.1-5 parts by weight, preferably 0.5-3 parts by weight. After the glycidyl compound is reacted with the polyolefin to some extent by melt-blending, the glycidyl compound is further added to carry out the melt blending stepwise. The addition of the glycidyl compound is repeated usually 2-10 times until the total amount of the glycidyl compound reaches the desired level.

Specifically, in a case where the blending is carried out by an extruder, etc., the modified product is extruded from the extruder to form its pellets, and the pellets are again introduced into the extruder together with a new supply of the glycidyl compound. A cycle consisting of the addition of the glycidyl compound, the blending and the extrusion is repeated by desired times. Incidentally, the extrusion steps are preferably 5 times or less. When the extrusion is conducted more than 5 times, the resulting modified polyolefin is deteriorated. On the other hand, in a case where a blender is used, a fresh supply of the glycidyl compound is added to the modified polyolefin at an interval of 10 seconds to 5 minutes while continuing the blending, until the total amount of the glycidyl compound reaches the desired level. When the interval of adding the glycidyl compound is less than 10 seconds, the glycidyl compound added previously is not fully reacted with the modified polyolefin, making it less likely to achieve a higher graft ratio by dividing the addition of the glycidyl compound. However, even when the interval exceeds 5 minutes, a further effect of achieving a higher graft ratio cannot be obtained. Incidentally, in the case of using the blender, the time interval between the initiation and completion of blending is usually 0.5-5 minutes or so.

When the blending time is less than 0.5 minutes, a sufficiently high graft ratio cannot be achieved, and even when it exceeds 5 minutes, a further effect of increasing a graft ratio cannot be achieved and the deterioration of the modified polyolefin may take place.

Since the modified polyolefin (graft copolymer) thus obtained suffers from only small decrease in a molecular weight, the modified polyolefin can have such a high molecular weight that cannot be achieved by the conventional method. In addition, the glycidyl compounds used in the method of the present invention do not generate an unpleasant odor at grafting. Further, they do not suffer from any discoloration, showing remarkable improvement over the modified polyolefin produced by using maleic anhydride, etc.

In the method of producing modified polyolefin according to the present invention, a particular glycidyl compound containing an acrylamide group and an epoxy group is grafted to the polyolefin in the presence of a radical generator. Therefore, the resulting modified polyolefin can serve effectively as a compatibilizer for various thermoplastic resin compositions, and it suffers little from decrease in a molecular weight in the course of graft polymerization, has a high graft ratio, generates no unpleasant odor at grafting, and suffers from no discoloration.

The reasons for obtaining such effects are not necessarily clear, but it is presumably due to the fact that a particular glycidyl compound is used as a graft monomer, which has an acrylamide at one end and an epoxy group at the other end and contains a benzene ring, thereby showing excellent characteristics such as a reactivity, a heat resistance, etc., and that the polyolefin is grafted with such a graft monomer.

Also, when the particular glycidyl compound is added as a graft monomer stepwise after the reaction proceeds sufficiently at each step, the glycidyl compound is prevented from being copolymerized with each other, so that a further increase in a graft ratio can be achieved, even if the total amount of the glycidyl compound added is unchanged.

The present invention will be explained in further detail by way of the following Examples.

Incidentally, in each of Examples and Comparative Examples, the following starting materials and additives were used:

[1] Polypropylene

HPP(1) Propylene homopolymer [melt flow rate (MFR, 230° C., 2.16 kg load)=1.0 g/10 minutes].
HPP(2) Propylene homopolymer [melt flow rate (MFR, 230° C., 2.16 kg load)=1.5 g/10 minutes].
HPP(3) Propylene homopolymer [melt flow rate (MFR, (MFR, 230° C., 2.16 kg load)=9 g/10 minutes].
BPP Propylene-ethylene block copolymer [ethylene content: 7.5 weight %, melt flow rate=1.0 g/10 minutes].
RPP Propylene-ethylene random copolymer [ethylene content: 3 weight %, melt flow rate=1.0 g/10 minutes].

[2] Unconjugated diene

DD 1,9-Decadiene.
MOD 7-Methyl-1,6-octadiene.
HD 1,4-Hexadiene.

[3] Polyethylene

HDPE(1) High-density polyethylene [melt index (MI, 190° C., 2.16 kg load)=1.0 g/10 minutes, density=0.953 g/cm$^3$].

HDPE(2) High-density polyethylene [melt index (MI, 190° C., 2.16 kg load)=5.0 g/10 minutes, density=0.95 g/cm$^3$].

LDPE Low-density polyethylene ["NUC-8210" manufactured by Nippon Unicar Co., Ltd., melt index (MI, 190° C., 2.16 kg load)=1.0 g/10 minutes, density=0.919 g/cm$^3$].

LLDPE(1) Linear low-density polyethylene ["GR-211" manufactured by Nippon Unicar Co., Ltd., melt index (MI, 190° C., 2.16 kg load)=1.0 g/10 minutes, density=0.918 g/cm$^3$].

LLDPE(2) Linear low-density polyethylene [melt index (MI, 190° C., 2.16 kg load)=3.0 g/10 minutes, density=0.92 g/cm$^3$, butene-1 content=5.5 weight %].

[4] Olefinic elastomer

EBR Ethylene-butene copolymer rubber [butene content: 80%, melt flow rate (MFR, 230° C., 2.16 kg load)=1.5 g/10 minutes].

EPR Ethylene-propylene copolymer rubber [propylene content: 70%, melt flow rate (MFR, 230° C., 2.16 kg load)=1.7 g/10 minutes].

[5] Graft monomer

AXE Glycidyl compound (manufactured by Kanegafuchi Chemical Industry Co., Ltd.) represented by the following general formula:

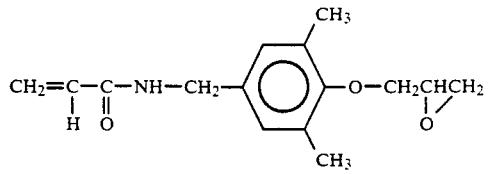

GMA Glycidyl methacrylate (manufactured by Nippon Oil and Fats Co., Ltd).

MAH Maleic anhydride.

[6] Radical generator

POX Perhexyne 2-5B (manufactured by Nippon Oil and Fats Co., Ltd.).

EXAMPLES 1-7, COMPARATIVE EXAMPLES 1-5

Each of various polypropylenes (PP) shown in Table 1 was dry-blended with a graft comonomer and a radical generator in amounts shown in Table 1 by using a Henschel mixer, and the resulting mixture was then graft-polymerized by melt-blending at a temperature of 200° C. and 80 rpm for 5 minutes in a laboplastomill.

With respect to each of the modified polypropylene thus obtained, its melt flow rate, graft ratio of the graft monomer, and color were evaluated. The results are shown in Table 1.

50 parts by weight of this modified polypropylene and 50 parts by weight of polybutylene terephthalate (hereinafter simply referred to as "PBT," "TRB-K ®" manufactured by Teijin, Ltd.) were graft-polymerized by melt-blending at 200° C. and 80 rpm for 5 minutes in a laboplastomill.

The resulting modified polypropylene-polybutylene terephthalate graft copolymer was measured with respect to a graft ratio of the polybutylene terephthalate. The results are also shown in Table 1.

TABLE 1

| | Example No. | | | | | | |
|---|---|---|---|---|---|---|---|
| | 1 | 2 | 3 | 4 | 5 | 6 | 7 |
| Composition | | | | | | | |
| PP | HPP(2) | HPP(2) | HPP(2) | HPP(3) | RPP | BPP | HPP(2) |
| MFR (g/10 minutes) (1) | 1.5 | 1.5 | 1.5 | 9 | 1.0 | 1.0 | 1.5 |
| Graft Monomer | AXE | AXE | AXE | AXE | AXE | AXE | AXE |
| Amount (phr) | 2 | 5 | 10 | 5 | 5 | 5 | 5 |
| Grafting Conditions | | | | | | | |
| Temperature (°C.) | 200 | 200 | 200 | 200 | 200 | 200 | 180 |
| Amount of POX (phr) | 0.1 | 0.1 | 0.1 | 0.1 | 0.1 | 0.1 | — |
| Unpleasant Odor At Grafting | No | No | No | No | No | No | No |
| Properties | | | | | | | |
| MFR (g/10 minutes) (1) | 24 | 52 | 71 | 61 | 45 | 38 | 44 |
| Graft Ratio (Weight %) (2) | 1.8 | 2.1 | 2.5 | 2.0 | 2.2 | 2.3 | 2.2 |
| Color (3) | White | White | White | White | White | White | White |
| Graft Ratio (Weight %) of PBT in Modified PP-PBT Graft Copolymer (4) | 14.5 | 16.7 | 24.2 | 16.2 | 19.4 | 21.2 | 20.6 |

| | Comparative Example No. | | | | |
|---|---|---|---|---|---|
| | 1 | 2 | 3 | 4 | 5 |
| Composition | | | | | |
| PP | HPP(2) | HPP(2) | RPP | BPP | HPP(2) |
| MFR (g/10 minutes) (1) | 1.5 | 1.5 | 1.0 | 1.0 | 1.5 |
| Graft Monomer | MAH | MAH | MAH | MAH | GMA |
| Amount (phr) | 1 | 5 | 1 | 1 | 1 |
| Grafting Conditions | | | | | |
| Temperature (°C.) | 200 | 200 | 200 | 200 | 200 |
| Amount of POX (phr) | 0.1 | 0.1 | 0.1 | 0.1 | 0.1 |
| Unpleasant Odor At Grafting | Yes | Yes | Yes | Yes | Yes |
| Properties | | | | | |
| MFR (g/10 minutes) (1) | 41 | 113 | 31 | 26 | 21 |

TABLE 1-continued

| | | | | | |
|---|---|---|---|---|---|
| Graft Ratio (Weight %) (2) | 0.2 | 0.5 | 0.2 | 0.3 | 0.3 |
| Color (3) | Pale Yellow | Pale Yellow | Pale Yellow | Pale Yellow | Pale Yellow |
| Graft Ratio (Weight %) of PBT in Modified PP-PBT Graft Copolymer (4) | 2.5 | 4.7 | 2.5 | 3.5 | 6.8 |

Note:
(1) MFR: Measured according to JIS K7210.
(2) Graft ratio of modifying monomer
(i) In the case of AXE
The modified polypropylene was dissolved in a boiling xylene to remove an undissolved fraction. A dissolved fraction of the modified polypropylene was precipitated by methanol, and the resulting precipitate was pressed to a thickness of about 50 μm to conduct an IR spectrum measurement. The graft ratio was defined as a ratio of a peak (1648 cm$^{-1}$) representing the vibration of the C=O bond of AXE to one peak (840 cm$^-$) peculiar to isotactic PP.
(ii) In the case of MAH
The modified polypropylene was pressed to a thickness of about 50 μm to conduct an IR spectrum measurement, and the graft ratio was defined as a ratio of a peak (1780 cm$^{-1}$) representing the vibration of the C=O bond of maleic anhydride to one peak (840 cm$^1$) peculiar to isotactic PP.
(iii) In the case of GMA
The modified polypropylene was pressed to a thickness of about 50 μm to conduct an IR spectrum measurement, and the graft ratio was defined as a ratio of a peak (1150 cm$^{-1}$) representing the vibration of the glycidyl group of glycidyl methacrylate to one peak (840 cm$^1$) peculiar to isotactic PP.
(3) Observed by the naked eye.
(4) Graft ratio of polybutylene terephthalate
The modified polypropylene-polybutylene terephthalate graft copolymer was pulverized to a particle size of 0.246 mm or less and extracted in m-cresol at 120° C. to remove unreacted polybutylene terephthalate. The remaining sample was pressed to a film having a thickness of 50-100 μm. The IR spectrum measurement of the sample provided peaks (700, 1504, 1580 cm$^{-1}$) peculiar to polybutylene terephthalate and not affected by the graft polymerization. From their percentages, the graft ratio was obtained by the following equation:

$$\text{Graft Ratio} = \frac{\text{Weight of Grafted PBT}}{\text{Weight of Graft Copolymer}} \times 100\ (\%)$$

As is clear from Table 1, the modified polypropylene obtained according to the present invention suffered from little increase in a melt flow rate even at a high graft ratio. It also suffered from little discoloration such as yellowish coloring and no unpleasant odor. Further, when grafted with polybutylene terephthalate, the modified polypropylene-polybutylene terephthalate graft copolymer showed a high graft ratio.

On the other hand, in the case of modified polypropylene in Comparative Examples 1-4, which used maleic anhydride as a modifying monomer, the graft ratio of maleic anhydride was low, and the resulting modified polypropylene turned pale-yellowish and generated an unpleasant odor. Also, when grafted with polybutylene terephthalate, the resulting modified polypropylene-polybutylene terephthalate graft copolymer showed a small graft ratio.

The modified polypropylene of Comparative Example 5 using glycidyl methacrylate as a modifying monomer showed a small graft ratio of glycidyl methacrylate. Also, when grafted with polybutylene terephthalate, it showed a low graft ratio.

EXAMPLES 8-15, COMPARATIVE EXAMPLES 6 AND 7

Propylene and each of various unconjugated diene comonomers shown in Table 2 were random-copolymerized at 70° C. by using a propylene-polymerizing Ziegler-Natta catalyst based on titanium trichloride. Each of the resulting propylene random copolymer (PPDM) had a comonomer content and a melt flow rate as shown in Table 2.

Each of the resulting propylene random copolymers (PPDM) was dry-blended with a graft monomer and a radical generator in amounts shown in Table 2 by using a Henschel mixer, and the resulting mixture was then graft-polymerized by melt-blending at a temperature of 200° C. and 80 rpm for 5 minutes in a laboplastomill.

With respect to each of the modified PPDM thus obtained, its melt flow rate, graft ratio of the graft monomer, gel ratio and color were evaluated. The results are shown in Table 2.

50 parts by weight of this modified PPDM and 50 parts by weight of polybutylene terephthalate (hereinafter simply referred to as "PBT," "TRB-K ®" manufactured by Teijin, Ltd.) were graft-polymerized by melt-blending at 200° C. and 80 rpm for 5 minutes in a laboplastomill.

The resulting modified PPDM-polybutylene terephthalate graft copolymer was measured with respect to a graft ratio of the polybutylene terephthalate. The results are also shown in Table 2.

TABLE 2

| | Example No. | | | | | | | | Comparative Example No. | |
|---|---|---|---|---|---|---|---|---|---|---|
| | 8 | 9 | 10 | 11 | 12 | 13 | 14 | 15 | 6 | 7 |
| Composition | | | | | | | | | | |
| PPDM | | | | | | | | | | |
| Comonomer | DD | DD | DD | DD | DD | DD | MOD | HD | DD | DD |
| Amount (mol %) | 0.4 | 0.4 | 0.4 | 0.2 | 0.6 | 0.4 | 0.6 | 0.7 | 0.3 | 0.3 |
| MFR (g/10 minutes) (1) | 5 | 5 | 5 | 3 | 10 | 5 | 7 | 12 | 28 | 28 |
| Graft Monomer | | | | | | | | | | |
| Type | AXE | AXE | AXE | AXE | AXE | AXE | AXE | AXE | MAH | MAH |
| Amount (phr) | 2 | 5 | 10 | 5 | 5 | 5 | 5 | 5 | 1 | 5 |
| Grafting Conditions | | | | | | | | | | |
| Temperature (°C.) | 200 | 200 | 200 | 200 | 200 | 200 | 200 | 200 | 200 | 200 |
| Amount of POX (phr) | 0.1 | 0.1 | 0.1 | 0.1 | 0.1 | — | 0.1 | 0.1 | 0.1 | 0.1 |
| Unpleasant Odor At Grafting | No | No | No | No | No | No | No | No | Yes | Yes |
| Properties | | | | | | | | | | |
| MFR (g/10 minutes) (1) | 19 | 54 | 78 | 38 | 66 | 22 | 59 | 87 | 40 | 31 |
| Graft Ratio (Weight %) (2) | 1.8 | 2.7 | 3.0 | 2.2 | 3.1 | 1.9 | 2.0 | 2.2 | 0.4 | 1.1 |
| Gel Ratio (Weight %) (3) | 0 | 1.1 | 2.2 | 1.1 | 1.2 | 0.5 | 1.0 | 1.4 | 7.4 | 37.2 |

TABLE 2-continued

|  | Example No. | | | | | | | | Comparative Example No. | |
| --- | --- | --- | --- | --- | --- | --- | --- | --- | --- | --- |
|  | 8 | 9 | 10 | 11 | 12 | 13 | 14 | 15 | 6 | 7 |
| Color (4) | White | White | White | White | White | White | White | White | Pale Yellow | Pale Yellow |
| Graft Ratio (Weight %) of PBT in Modified PP-PBT Graft Copolymer (5) | 15.3 | 23.8 | 24.2 | 19.4 | 28.5 | 18.0 | 16.7 | 19.4 | 2.5 | 4.0 |

Note:
(1), (2) Same as Notes (1) and (2) under Table 1.
(3) Gel percentage
The modified polypropylene was pressed to a thickness of 0.5 mm, and about 4 g of this pressed body was immersed in boiling xylene for 24 hours, and the weight of a xylene-insoluble fraction was measured. The gel percentage was obtained from the following equation:

$$\text{Gel Percentage} = \frac{\text{Weight of Xylene-Insoluble Fraction}}{\text{Initial Weight}} \times 100 (\%)$$

(4) Observed by the naked eye.
(5) Same as Note (4) under Table 1.

As is clear from Table 2, the modified PPDM obtained according to the present invention suffered from little increase in a melt flow rate even at a high graft ratio. It also showed a small gel ratio and suffered from little discoloration such as yellowish coloring and no unpleasant odor. Further, when grafted with polybutylene terephthalate, the resulting modified PPDM-polybutylene terephthalate showed a high graft ratio.

On the other hand, the unconjugated diene-containing propylene random copolymer modified with maleic anhydride as a modifying monomer in Comparative Examples 6 and 7 showed a small graft ratio of maleic anhydride, a high gel ratio, yellow color and an unpleasant odor. Also, when grafted with polybutylene terephthalate, the resulting modified PPDM-polybutylene terephthalate graft copolymer showed a low graft ratio.

EXAMPLES 16-23, COMPARATIVE EXAMPLES 8-12

Each of various polyethylenes (HDPE(1), LDPE and LLDPE(1)) shown in Table 3 was dry-blended with a graft monomer and a radical generator in amounts shown in Table 3 by using a Henschel mixer, and the resulting mixture was then graft-polymerized by melt-blending at a temperature of 200° C. and 80 rpm for 5 minutes in a laboplastomill.

With respect to each of the modified polyethylene thus obtained, its melt index, graft ratio of the graft monomer, and color were evaluated. The results are shown in Table 3.

50 parts by weight of this modified polyethylene and 50 parts by weight of polybutylene terephthalate (hereinafter simply referred to as "PBT," "TRB-K ®" manufactured by Teijin, Ltd.) were graft-polymerized by melt-blending at 200° C. and 80 rpm for 5 minutes in a laboplastomill.

The resulting modified polyethylene-polybutylene terephthalate graft copolymer was measured with respect to a graft ratio of the polybutylene terephthalate. The results are also shown in Table 3.

TABLE 3

|  | Example No. | | | | | | | |
| --- | --- | --- | --- | --- | --- | --- | --- | --- |
|  | 16 | 17 | 18 | 19 | 20 | 21 | 22 | 23 |
| Composition |
| PE | HDPE(1) | HDPE(1) | HDPE(1) | HDPE(1) | LDPE | LDPE | LLDPE(1) | LLDPE(1) |
| MI (g/10 minutes)[1] | 1.0 | 1.0 | 1.0 | 1.0 | 1.0 | 1.0 | 1.0 | 1.0 |
| Graft Monomer | AXE | AXE | AXE | AXE | AXE | AXE | AXE | AXE |
| Amount (phr) | 2 | 5 | 10 | 2 | 2 | 5 | 2 | 5 |
| Grafting Conditions |
| Temperature (°C.) | 200 | 200 | 200 | 200 | 200 | 200 | 180 | 180 |
| Amount of POX (phr) | 0.1 | 0.1 | 0.1 | — | 0.1 | 0.1 | 0.1 | 0.1 |
| Unpleasant Odor At Grafting | No | No | No | No | No | No | No | No |
| Properties |
| MI (g/10 minutes)[1] | 0.7 | 1.4 | 3.4 | 1.0 | 0.6 | 0.9 | 0.8 | 1.2 |
| Graft Ratio (Weight %)[2] | 1.7 | 2.5 | 2.8 | 1.2 | 1.5 | 2.5 | 1.6 | 2.3 |
| Color[3] | White | White | White | White | White | White | White | White |
| Graft Ratio (Weight %) of PBT in Modified PE-PBT Graft Copolymer[4] | 12.3 | 16.8 | 23.4 | 9.6 | 12.1 | 18.0 | 11.9 | 17.6 |

|  | Comparative Example No. | | | | |
| --- | --- | --- | --- | --- | --- |
|  | 8 | 9 | 10 | 11 | 12 |
| Composition |
| PE | HDPE(1) | HDPE(1) | HDPE(1) | LDPE | LLDPE(1) |
| MI (g/10 minutes)[1] | 1.0 | 1.0 | 1.0 | 1.0 | 1.0 |
| Graft Monomer | MAH | MAH | GMA | MAH | MAH |
| Amount (phr) | 1 | 5 | 2 | 1 | 1 |
| Grafting Conditions |
| Temperature (°C.) | 200 | 200 | 200 | 200 | 200 |
| Amount of POX (phr) | 0.1 | 0.1 | 0.1 | 0.1 | 0.1 |
| Unpleasant Odor At Grafting | Yes | Yes | Yes | Yes | Yes |
| Properties |
| MI (g/10 minutes)[1] | 0.1 | 0.02 | 0.7 | 0.2 | 0.2 |

TABLE 3-continued

|  | | | | | |
|---|---|---|---|---|---|
| Graft Ratio (Weight %)[2] | 0.8 | 2.5 | 0.1 | 0.7 | 0.7 |
| Color[3] | Pale Yellow | Pale Yellow | Pale Yellow | Pale Yellow | Pale Yellow |
| Graft Ratio (Weight %) of PBT in Modified PE-PBT Graft Copolymer[4] | 3.0 | 4.2 | 0.2 | 2.5 | 2.3 |

Note:
[1] MI: Measured according to JIS K7210.
[2] Graft ratio of modifying monomer Same as Note (2) under Table 1 except for the following:
(i) In the case of AXE The graft ratio was defined as a ratio of a peak (1648 cm$^{-1}$) representing the vibration of the C=O bond of AXE to a sample thickness.
(ii) In the case of MAH The graft ratio was defined as a ratio of a peak (1780 cm$^{-1}$) representing the vibration of the C=O bond of maleic anhydride to a sample thickness.
(iii) In the case of GMA The graft ratio was defined as a ratio of a peak (1150 cm$^{-1}$) representing the vibration of the glycidyl group of glycidyl methacrylate to a sample thickness.
[3] Observed by the naked eye.
[4] Graft ratio of polybutylene terephthalate Same as Note (4) under Table 1.

As is clear from Table 3, the modified polyethylene obtained according to the present invention suffered from little increase in a melt index even at a high graft ratio. It also suffered from little discoloration such as yellowish coloring and no unpleasant odor. Further, when grafted with polybutylene terephthalate, the resulting modified polyethylene-polybutylene terephthalate graft copolymer showed a high graft ratio.

On the other hand, in the case of modified polyethylene in Comparative Examples 8, 9, 11 and 12, which used maleic anhydride as a modifying monomer, the resulting modified polyethylene turned pale-yellowish and generated an unpleasant odor. Also, when grafted with polybutylene terephthalate, the resulting modified polyethylene-polybutylene terephthalate showed a small graft ratio.

The modified polyethylene of Comparative Example 10 using glycidyl methacrylate as a modifying monomer showed a small graft ratio of glycidyl methacrylate and turned pale-yellowish. Also, when grafted with polybutylene terephthalate, it showed a low graft ratio.

EXAMPLES 24-29, COMPARATIVE EXAMPLES 13-17

Each of various olefinic elastomers shown in Table 4 was dry-blended with a graft monomer and a radical generator in amounts shown in Table 4 by using a Henschel mixer, and the resulting mixture was then graft-polymerized by melt-blending at a temperature of 200° C. and 80 rpm for 5 minutes in a laboplastomill.

Incidentally, in Example 29, an olefinic elastomer composition comprising 80 parts by weight of an ethylene-propylene copolymer rubber and 20 parts by weight of a high-density polyethylene ("B6140" manufactured by Tonen Chemical Corporation) was used.

With respect to each of the modified olefinic elastomers thus obtained, its melt flow rate and graft ratio of the graft monomer were evaluated. The results are shown in Table 4.

50 parts by weight of this modified olefinic elastomer and 50 parts by weight of polybutylene terephthalate (hereinafter simply referred to as "PBT," "TRB-K ®" manufactured by Teijin, Ltd.) were graft-polymerized by melt-blending at 200° C. and 30 rpm for 5 minutes in a laboplastomill.

The modified olefinic elastomer-polybutylene terephthalate copolymer was measured with respect to a graft ratio of the polybutylene terephthalate. The results are also shown in Table 4.

TABLE 4

|  | Example No. | | | | | |
|---|---|---|---|---|---|---|
|  | 24 | 25 | 26 | 27 | 28 | 29 |
| Composition | | | | | | |
| Olefinic Elastomer | EBR | EBR | EBR | EBR | EPR | EPR/HDPE |
| MFR (g/10 minutes)[1] | 1.5 | 1.5 | 1.5 | 1.5 | 1.7 | — |
| Graft Monomer | AXE | AXE | AXE | AXE | AXE | AXE |
| Amount (phr) | 1 | 3 | 10 | 3 | 3 | 3 |
| Grafting Conditions | | | | | | |
| Temperature (°C.) | 200 | 200 | 200 | 180 | 200 | 200 |
| Amount of POX (phr) | 0.1 | 0.1 | 0.1 | 0.1 | 0.1 | 0.1 |
| Unpleasant Odor At Grafting[2] | No | No | No | No | No | No |
| Properties | | | | | | |
| MFR (g/10 minutes)[1] | 0.34 | 0.32 | 0.54 | 0.39 | 0.41 | 4.03 |
| Graft Ratio (Weight %)[3] | 0.8 | 2.2 | 3.0 | 2.3 | 2.0 | 2.1 |
| Graft Ratio (Weight %) of PBT in Modified Olefinic Elastomer-PBT Graft Copolymer[4] | 7.4 | 14.3 | 21.4 | 13.3 | 12.3 | 11.4 |

|  | Comparative Example No. | | | | |
|---|---|---|---|---|---|
|  | 13 | 14 | 15 | 16 | 17 |
| Composition | | | | | |
| Olefinic Elastomer | EBR | EBR | EPR | EPR/HDPE | EBR |
| MFR (g/10 minutes)[1] | 1.5 | 1.5 | 1.7 | — | 1.5 |
| Graft Monomer | MAH | MAH | MAH | MAH | GMA |
| Amount (phr) | 1 | 3 | 1 | 1 | 1 |
| Grafting Conditions | | | | | |
| Temperature (°C.) | 200 | 200 | 200 | 200 | 200 |
| Amount of POX (phr) | 0.1 | 0.1 | 0.1 | 0.1 | 0.1 |
| Unpleasant Odor At Grafting[2] | Strong | Strong | Strong | Strong | Yes |
| Properties | | | | | |

TABLE 4-continued

| | | | | | |
|---|---|---|---|---|---|
| MFR (g/10 minutes)[1] | 1.1 | 0.6 | 3.1 | 3.8 | 2.1 |
| Graft Ratio (Weight %)[3] | 0.5 | 1.4 | 0.6 | 0.6 | 0.1 |
| Graft Ratio (Weight %) of PBT in Modified Olefinic Elastomer-PBT Graft Copolymer[4] | 0.1 | 0.4 | 0.3 | 0.3 | 0.4 |

Note:
[1] MFR: Measured according to JIS K7210.
[2] Evaluation of unpleasant odor No: No unpleasant odor. Yes: Generating unpleasant odor. Strong: Strong unpleasant odor.
[3] Graft ratio of modifying monomer Same as Note (2) under Table 1 except for the following:
(i) In the case of AXE The graft ratio was defined as a ratio of a peak (1648 cm$^{-1}$) representing the vibration of the C=O bond of AXE to a sample thickness.
(ii) In the case of MAH The graft ratio was defined as a ratio of a peak (1780 cm$^{-1}$) representing the vibration of the C=O bond of maleic anhydride to a sample thickness.
(iii) In the case of GMA The graft ratio was defined as a ratio of a peak (1150 cm$^{-1}$) representing the vibration of the glycidyl group of glycidyl methacrylate to a sample thickness.
[4] Graft ratio of polybutylene terephthalate Same as Note (4) under Table 1.

As is clear from Table 4, the modified olefinic elastomer obtained according to the present invention suffers from little increase in a melt flow rate even at a high graft ratio, and no unpleasant odor. Further, when grafted with polybutylene terephthalate, the resulting modified olefinic elastomer-polybutylene terephthalate showed a high graft ratio.

On the other hand, in the case of modified olefinic elastomer in Comparative Examples 13-17, which used maleic anhydride or glycidyl methacrylate as a modifying monomer, the graft ratio of the modifying monomer was low, and the resulting modified olefinic elastomer generated an unpleasant odor. Also, when grafted with polybutylene terephthalate, the resulting modified olefinic elastomer-polybutylene terephthalate showed a small graft ratio.

EXAMPLES 30-34

100 parts by weight of polypropylene (HPP(1)) was dry-blended with a modifying monomer and a radical generator stepwise in divided amounts shown in Table 5, and the resulting mixture was melt-blended at a temperature of 200° C. and 80 rpm for 5 minutes in a laboplastomill to produce a modified polypropylene.

With respect to each of the modified polypropylenes thus obtained, its melt flow rate, graft ratio of the graft monomer, and grafting efficiency (graft percentage) were evaluated. The results are shown in Table 5.

50 parts by weight of this modified polypropylene and 50 parts by weight of polybutylene terephthalate (hereinafter simply referred to as "PBT," "TRB-K ®" manufactured by Teijin, Ltd.) were graft-polymerized by melt-blending at 200° C. and 80 rpm for 5 minutes in a laboplastomill.

The resulting modified polypropylene-polybutylene terephthalate graft copolymer was measured with respect to a graft ratio of the polybutylene terephthalate. The results are also shown in Table 5.

TABLE 5

| Amount of Additives | Example No. | | | | |
|---|---|---|---|---|---|
| (Parts by Weight) | 30 | 31 | 32 | 33 | 34 |
| At First Step | | | | | |
| AXE | 1 | 1 | 2 | 3 | 3 |
| POX | 0.1 | 0.02 | 0.1 | 0.1 | 0.03 |
| At Second Step AXE | 1 | 1 | 2 | 3 | 3 |
| (After 1 min.) POX | 0 | 0.02 | 0 | 0 | 0.03 |
| At Third Step AXE | 1 | 1 | 2 | 3 | 3 |
| (After 2 min.) POX | 0 | 0.02 | 0 | 0 | 0.03 |
| Properties of Modified Polypropylene | | | | | |
| MFR (g/10 minutes) (1) | 51 | 18 | 46 | 44 | 26 |
| AXE Graft Ratio (2) (Weight %) | 2.3 | 2.5 | 4.8 | 5.5 | 6.4 |

TABLE 5-continued

| Amount of Additives | Example No. | | | | |
|---|---|---|---|---|---|
| (Parts by Weight) | 30 | 31 | 32 | 33 | 34 |
| Graft Percentage (3) (%) | 79 | 86 | 85 | 67 | 77 |
| Properties of PBT Graft Copolymer | | | | | |
| PBT Graft Ratio (4) (Weight %) | 15 | 18 | 28 | 34 | 42 |

Note:
(1) MFR: Measured at 230° C. according to JIS K 7210.
(2) Graft ratio of modifying monomer (AXE) Same as Note (2) under Table 1.
(3) Graft percentage $$\text{Graft Percentage} = \frac{\text{Amount of Grafted AXE}}{\text{Amount of Supplied AXE}} \times 100 \, (\%)$$

(4) Graft ratio polybutylene terephthalate Same as Note (2) under Table 1.

EXAMPLES 35-38

100 parts by weight of polypropylene (HPP(1)) was dry-blended with a modifying monomer and a radical generator in amounts shown in Table 6, and the resulting mixture was melt-blended at a temperature of 200° C. and 100 rpm in a 45-mm φ-double screw extruder (two screws rotating in the same direction). The resulting extrudate was mixed with a fresh supply of a modifying monomer and a radical generator by such times as shown in Table 6 and melt-blended in the extruder to produce a modified polypropylene.

With respect to each of the modified polypropylenes thus obtained, its melt flow rate, graft ratio of the graft monomer, and grafting efficiency (graft percentage) were evaluated. The results are shown in Table 6.

50 parts by weight of this modified polypropylene and 50 parts by weight of polybutylene terephthalate (hereinafter simply referred to as "PBT," "TRB-K ®" manufactured by Teijin, Ltd.) were graft-polymerized by melt-blending at 200° C. and 80 rpm for 5 minutes in a laboplastomill.

The resulting modified polypropylene-polybutylene terephthalate graft copolymer was measured with respect to a graft ratio of the polybutylene terephthalate. The results are also shown in Table 6.

TABLE 6

| Amount of Additives | | Example No. | | | |
|---|---|---|---|---|---|
| (Parts by Weight) | | 35 | 36 | 37 | 38 |
| At First Step | AXE | 1 | 1 | 1 | 2 |
| | POX | 0.02 | 0.02 | 0.02 | 0.02 |
| At Second Step | AXE | 1 | 1 | 1 | 2 |
| | POX | 0.02 | 0.02 | 0.02 | 0.02 |
| At Third Step | AXE | 1 | 1 | 1 | 2 |
| | POX | 0.02 | 0.02 | 0.02 | 0.02 |
| At Fourth Step | AXE | — | 1 | 1 | — |
| | POX | — | 0.02 | 0.02 | — |
| At Fifth Step | AXE | — | — | 1 | — |

TABLE 6-continued

| Amount of Additives | Example No. | | | |
|---|---|---|---|---|
| (Parts by Weight) | 35 | 36 | 37 | 38 |
| POX | — | — | 0.02 | — |
| Properties of Modified Polypropylene | | | | |
| MFR (g/10 minutes)[1] | 11 | 21 | 29 | 44 |
| AXE Graft Ratio[2] (Weight %) | 2.4 | 3.1 | 4.1 | 4.7 |
| Graft Percentage[3] (%) | 82 | 81 | 86 | 83 |
| Properties of PBT Graft Copolymer | | | | |
| PBT Graft Ratio[4] (Weight %) | 17 | 22 | 26 | 29 |

Note:
[1]-[4] Same as Notes [1]-[4] under Table 5.

EXAMPLES 39-42

100 parts by weight of polyethylene (HDPE(2), LLDPE(2)) was dry-blended with a modifying monomer and a radical generator in amounts shown in Table 7, and the resulting mixture was melt-blended at a temperature of 180° C. for 5 minutes in a laboplastomill to produce a modified polyethylene.

With respect to each of the modified polyethylenes thus obtained, its melt index, graft ratio of the graft monomer, and grafting efficiency (graft percentage) were evaluated. The results are shown in Table 7.

50 parts by weight of this modified polyethylene and 50 parts by weight of polybutylene terephthalate (hereinafter simply referred to as "PBT," "TRB-K ®" manufactured by Teijin, Ltd.) were graft-polymerized by melt-blending at 200° C. and 80 rpm for 5 minutes in a laboplastomill.

The resulting modified polyethylene-polybutylene terephthalate graft copolymer was measured with respect to a graft ratio of the polybutylene terephthalate. The results are also shown in Table 7.

TABLE 7

| | | Example No. | | | |
|---|---|---|---|---|---|
| | | 39 | 40 | 41 | 42 |
| Polyethylene | | HDPE(2) | HDPE(2) | LLDPE(2) | LLDPE(2) |
| Amount of AXE/POX (Parts by Weight) | | | | | |
| At First Step | AXE | 1 | 2 | 1 | 2 |
| | POX | 0.1 | 0.1 | 0.1 | 0.1 |
| At Second Step | AXE | 1 | 2 | 1 | 2 |
| (After 1 min.) | POX | 0 | 0 | 0 | 0 |
| At Third Step | AXE | 1 | 2 | 1 | 2 |
| (After 2 min.) | POX | 0 | 0 | 0 | 0 |
| Properties of Modified Polyethylene | | | | | |
| MI (g/10 minutes)[1] | | 4.0 | 3.8 | 2.5 | 2.2 |
| AXE Graft Ratio[2] (Weight %) | | 2.6 | 5.1 | 2.7 | 5.2 |
| Graft Percentage (%) | | 89 | 90 | 93 | 92 |
| Properties of PBT Graft Copolymer | | | | | |
| PBT Graft Ratio (Weight %) | | 19 | 32 | 21 | 34 |

Note:
[1] MI: Measured at 190° C. according to JIS K 7210.
[2] Graft ratio of modifying monomer (AXE) Same as Note (2) under Table 3.

EXAMPLES 43 AND 44

100 parts by weight of an ethylene-propylene copolymer rubber (EPR) was dry-blended with a modifying monomer and a radical generator in amounts shown in Table 8, and the resulting mixture was melt-blended at a temperature of 180° C. for 5 minutes in a laboplastomill to produce a modified EPR.

With respect to each of the modified EPR thus obtained, its melt flow rate, graft ratio of the graft monomer, and grafting efficiency (graft percentage) were evaluated. The results are shown in Table 8.

50 parts by weight of this modified EPR and 50 parts by weight of polybutylene terephthalate (hereinafter simply referred to as "PBT," "TRB-K ®" manufactured by Teijin, Ltd.) were graft-polymerized by melt-blending at 200° C. and 80 rpm for 5 minutes in a laboplastomill.

The resulting modified EPR-polybutylene terephthalate graft copolymer was measured with respect to a graft ratio of the polybutylene terephthalate. The results are also shown in Table 8.

TABLE 8

| Amount of Additives | | Example No. | |
|---|---|---|---|
| (Parts by Weight) | | 43 | 44 |
| At First Step | AXE | 1 | 2 |
| | POX | 0.1 | 0.1 |
| At Second Step | AXE | 1 | 2 |
| (After 1 min.) | POX | 0 | 0 |
| At Third Step | AXE | 1 | 2 |
| (After 2 min.) | POX | 0 | 0 |
| Properties of Modified Rubber | | | |
| MFR (g/10 minutes)[1] | | 12 | 9 |
| AXE Graft Ratio[2] (Weight %) | | 2.7 | 5.2 |
| Graft Percentage (%) | | 93 | 92 |
| Properties of PBT Graft Copolymer | | | |
| PBT Graft Ratio[3] (Weight %) | | 23 | 27 |

Note:
[1] Same as Note (1) under Table 1.
[2] Graft ratio of modifying monomer (AXE) Same as Note (2) under Table 3.
[3] Graft ratio of PBT.

As is clear from Tables 5-8, the modified polyolefins obtained according to the preferred embodiments of the present invention had higher graft ratios and grafting efficiencies (graft percentages) than those obtained by supplying AXE at a time. Further, when grafted with polybutylene terephthalate, the modified polyolefin-polybutylene terephthalate copolymer showed a higher graft ratio.

Incidentally, with respect to each Comparative Example, a low graft ratio is presumably due to the fact that the modified polyolefin itself in Comparative Examples has a small graft ratio of a modifying monomer.

With respect to the melt flow rate, it is usually correlated with a molecular weight, and it is assumed that the larger the melt flow rate, the larger the molecular weight.

In the method of the present invention, a polyolefin is modified with a particular glycidyl compound having an acrylamide group and an epoxy group in the presence of a radical generator. Accordingly, the resulting modified polyolefin is suitable as a compatibilizer for various resin compositions. The modified polyolefin suffers from little decrease in a molecular weight in the course of graft polymerization, and the modified polyolefin can be grafted with other polymers at a high graft ratio. In the process of graft polymerization, there is no unpleasant odor, making the operating conditions comfortable.

Since functional groups are introduced by a graft monomer at a high concentration, the modified polyolefin shows improved chemical properties such as adhesion, paintability, printability, hydrophilic nature, etc. Also, it is free from an unpleasant odor peculiar to maleic anhydride, etc., and its discoloration is substantially prevented. Further, since it has a less decreased molecular weight, its moldability is excellent.

The modified polyolefin obtained according to the present invention is suitable as a compatibilizer for resin compositions for automobile parts, home electric appliance, industrial parts, wrappings, etc. and as an adhesive for various metals, etc.

What is claimed is:

1. A method of producing a modified polyolefin comprising the step of graft-polymerizing:
   (a) 100 parts by weight of a polyolefin, with
   (b) 0.01-30 parts by weight of a glycidyl compound represented by the following general formula:

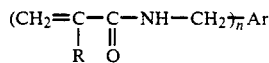

wherein R is a hydrogen atom or an alkyl group having 1-6 carbon atoms, Ar is an aromatic hydrocarbon group having 6-20 carbon atoms and containing at least one glycidyloxy group, and n is an integer of 1-4.

2. The method of producing a modified polyolefin according to claim 1, wherein said polyolefin is polypropylene.

3. The method of producing a modified polyolefin according to claim 1, wherein said polyolefin is a propylene random copolymer containing an unconjugated diene comonomer represented by the following general formula:

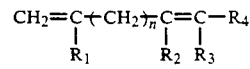

wherein each of $R_1$-$R_4$ is a hydrogen atom or an alkyl group having 1-6 carbon atoms, and n is an integer of 1-20.

4. The method of producing a modified polyolefin according to claim 1, wherein said polyolefin is polyethylene.

5. The method of producing a modified polyolefin according to claim 1, wherein said polyolefin is an olefinic elastomer comprising 5-95 weight % of ethylene and 95-5 weight % of an α-olefin other than ethylene.

6. The method of producing a modified polyolefin according to claim 1, wherein said polyolefin is an olefinic elastomer composition comprising (i) 20 weight % or more of an olefinic elastomer comprising 5-95 weight % of ethylene and 95-5 weight % of an α-olefin other than ethylene; and (ii) 80 weight % or less of polypropylene and/or polyethylene.

7. A method of producing a modified polyolefin comprising the step of adding:
   (a) 0.1-5 parts by weight of a glycidyl compound represented by the following general formula:

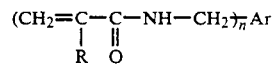

wherein R is a hydrogen atom or an alkyl group having 1-6 carbon atoms, Ar is an aromatic hydrocarbon group having 6-20 carbon atoms and containing at least one glycidyloxy group, and n is an integer of 1-4; to
   (b) 100 parts by weight of a polyolefin to cause a reaction therebetween,
said reaction being repeated two or more times.

8. The method of producing a modified polyolefin according to claim 7, wherein 0.1-5 parts by weight of an organic peroxide is added to 100 parts by weight of said polyolefin.

9. The method of producing a modified polyolefin according to claim 8, wherein said organic peroxide is added by two or more steps.

10. The method of producing a modified polyolefin according to claim 7, wherein said glycidyl compound is added to and reacted with said polyolefin by 2-10 steps, the amount of said glycidyl compound added at each step being 3 parts by weight or less, and the total amount of said glycidyl compound being 3-30 parts by weight.

* * * * *